US010258930B2

(12) United States Patent
Larson et al.

(10) Patent No.: US 10,258,930 B2
(45) Date of Patent: Apr. 16, 2019

(54) HIGH-PERFORMANCE, LOW-STRESS SUPPORT STRUCTURE WITH MEMBRANE

(71) Applicants: Mark Larson, Provo, UT (US); Erik Bard, Lehi, UT (US); Michael Lines, Cedar Hills, UT (US)

(72) Inventors: Mark Larson, Provo, UT (US); Erik Bard, Lehi, UT (US); Michael Lines, Cedar Hills, UT (US)

( * ) Notice: Subject to any disclaimer, the term of this patent is extended or adjusted under 35 U.S.C. 154(b) by 0 days.

(21) Appl. No.: 15/738,117

(22) PCT Filed: Jun. 19, 2016

(86) PCT No.: PCT/US2016/038279
§ 371 (c)(1),
(2) Date: Dec. 19, 2017

(87) PCT Pub. No.: WO2016/205772
PCT Pub. Date: Dec. 22, 2016

(65) Prior Publication Data
US 2018/0221830 A1    Aug. 9, 2018

Related U.S. Application Data

(60) Provisional application No. 62/181,932, filed on Jun. 19, 2015.

(51) Int. Cl.
*H01L 27/146*    (2006.01)
*B01D 69/10*    (2006.01)
(Continued)

(52) U.S. Cl.
CPC .......... *B01D 69/10* (2013.01); *B01D 63/087* (2013.01); *G01T 7/00* (2013.01); *G21K 1/10* (2013.01);
(Continued)

(58) Field of Classification Search
CPC .... G21K 1/10; G01N 23/223; G01N 23/2252; H01J 37/244; H01J 5/18; H01J 35/18; H01J 2237/24415; H01J 2237/2445; G01T 7/00
See application file for complete search history.

(56) References Cited

U.S. PATENT DOCUMENTS

| 3,828,190 A | 8/1974 | Dahlin |
| 4,862,490 A | 8/1989 | Karnezos |

(Continued)

FOREIGN PATENT DOCUMENTS

WO    2012047366 A4    12/2012

*Primary Examiner* — Kiho Kim

(57) ABSTRACT

A support structure for a membrane comprises a plurality of support members and at least one flange, including: (a) a first set of spoke-like support members that extend generally from at least one flange toward a common hub and that have a distal end joined to at least one flange and a proximal end joined to the common hub; and (b) at least one subsequent set of spoke-like support members that are distributed between circumferentially adjacent pairs of spoke-like support members from the prior sets and that extend generally from at least one flange toward the hub, each having a distal end joined to at least one flange and a proximal end connected to the nearest circumferentially adjacent pair of spoke-like support members from the prior sets via a pair of approximately straight anchoring support members which join together and form an angular joint at or near said proximal end, with the vertex of said angular joint pointing generally away from the hub.

36 Claims, 13 Drawing Sheets

(51) Int. Cl.
  *G21K 1/10* (2006.01)
  *H01J 5/18* (2006.01)
  *H01J 35/18* (2006.01)
  *B01D 63/08* (2006.01)
  *G01T 7/00* (2006.01)

(52) U.S. Cl.
  CPC ............... *H01J 5/18* (2013.01); *H01J 35/18* (2013.01); *B01D 2313/06* (2013.01); *H01J 2237/2445* (2013.01)

(56) References Cited

U.S. PATENT DOCUMENTS

| | | |
|---|---|---|
| 4,933,557 A | 6/1990 | Perkins |
| 4,939,763 A | 7/1990 | Pinneo |
| 4,960,486 A | 10/1990 | Perkins |
| 5,039,203 A | 8/1991 | Nishikawa |
| 5,173,612 A | 12/1992 | Imai |
| 5,258,091 A | 11/1993 | Imai |
| 5,417,519 A * | 5/1995 | Smuts ............... E04G 15/065 249/152 |
| 5,432,003 A | 6/1995 | Plano |
| 5,578,360 A | 11/1996 | Viitanen |
| 5,612,588 A | 3/1997 | Wakalopulos |
| 6,002,202 A | 12/1999 | Meyer |
| 7,035,379 B2 | 4/2006 | Turner |
| 7,233,647 B2 | 6/2007 | Turner |
| 7,618,906 B2 | 11/2009 | Meilahti |
| 7,660,393 B2 | 2/2010 | Sipilä |
| 7,709,820 B2 | 5/2010 | Decker |
| 7,737,424 B2 * | 6/2010 | Xu ................... H01J 47/004 250/374 |
| 7,756,251 B2 | 7/2010 | Davis |
| 8,929,515 B2 | 1/2015 | Liddiard |
| 8,964,943 B2 * | 2/2015 | Liddiard ............... H01J 35/18 378/161 |
| 8,989,354 B2 | 3/2015 | Davis |
| 9,076,628 B2 | 7/2015 | Davis |
| 9,666,323 B2 * | 5/2017 | Ohashi ............... G01N 23/223 |
| 2004/0177757 A1 * | 9/2004 | Bailey ............... B01D 46/0056 95/273 |
| 2005/0203568 A1 * | 9/2005 | Burg ................... A61B 17/0057 606/200 |
| 2008/0296479 A1 | 12/2008 | Anderson |
| 2009/0086923 A1 * | 4/2009 | Davis ................... H01J 5/18 378/161 |
| 2011/0121179 A1 | 5/2011 | Liddiard |
| 2012/0025110 A1 | 2/2012 | Davis |
| 2012/0213336 A1 * | 8/2012 | Liddiard ............... G21K 1/02 378/161 |
| 2012/0317944 A1 * | 12/2012 | Lise ................... B01D 46/0002 55/499 |
| 2013/0000253 A1 * | 1/2013 | berg ................... H01J 33/04 53/425 |
| 2014/0044240 A1 | 2/2014 | Pahlke |
| 2014/0140487 A1 | 5/2014 | Harker |
| 2015/0016593 A1 * | 1/2015 | Larson ............... G21K 1/00 378/161 |
| 2015/0204282 A1 * | 7/2015 | Merritt ............... B01D 46/0023 55/482 |
| 2015/0212434 A1 | 7/2015 | Lairson |
| 2015/0235726 A1 | 8/2015 | Ohashi |
| 2015/0303024 A1 | 10/2015 | Harker |
| 2015/0357150 A1 | 12/2015 | Kostamo |
| 2018/0019089 A1 | 1/2018 | Lairson |

* cited by examiner

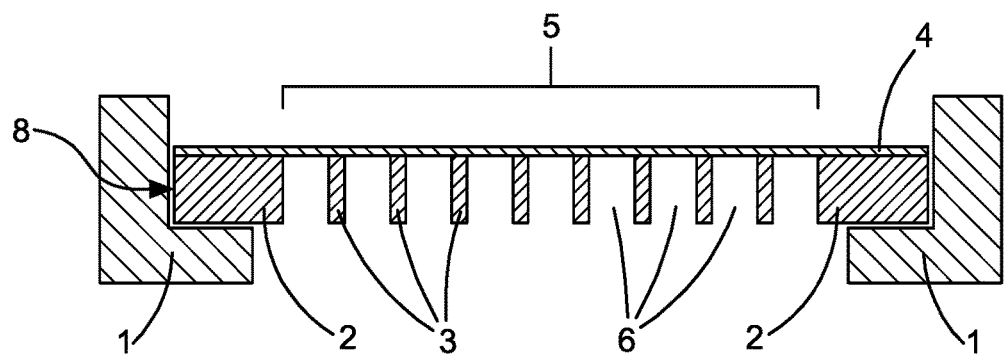
Prior Art Fig. 1
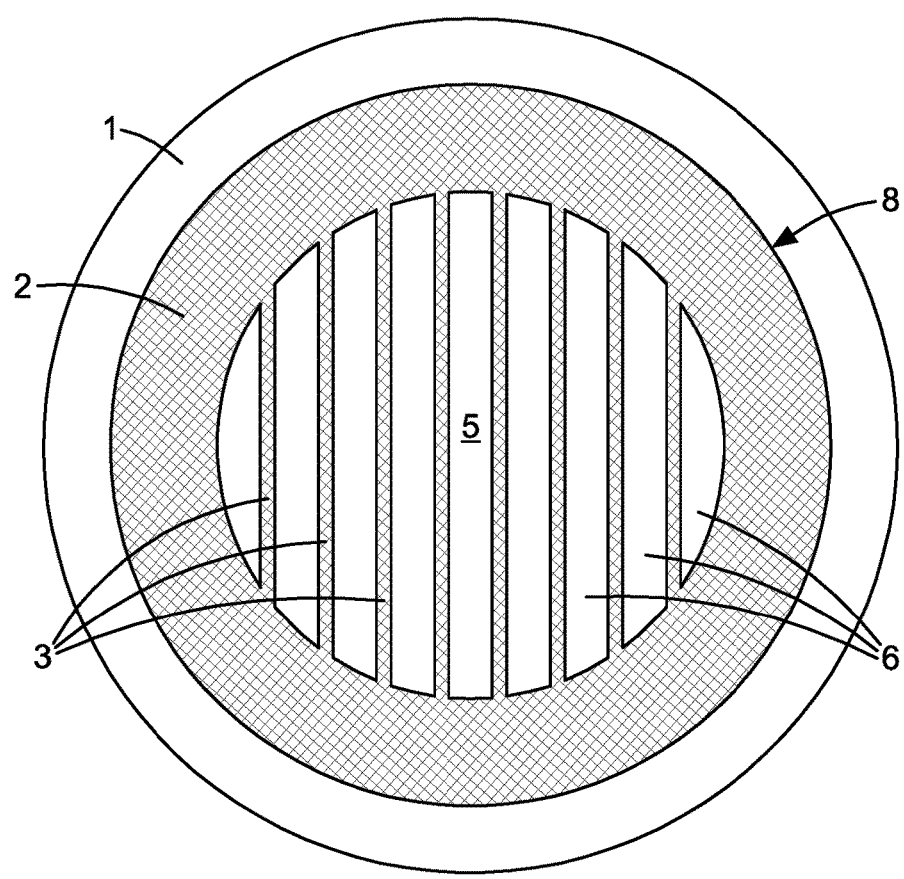
Prior Art Fig. 2

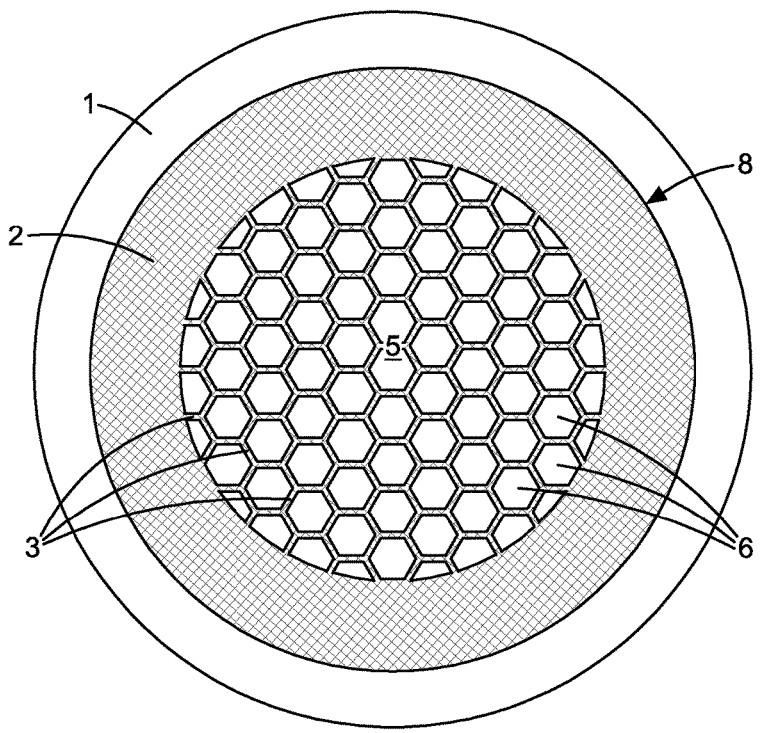
Prior Art Fig. 3
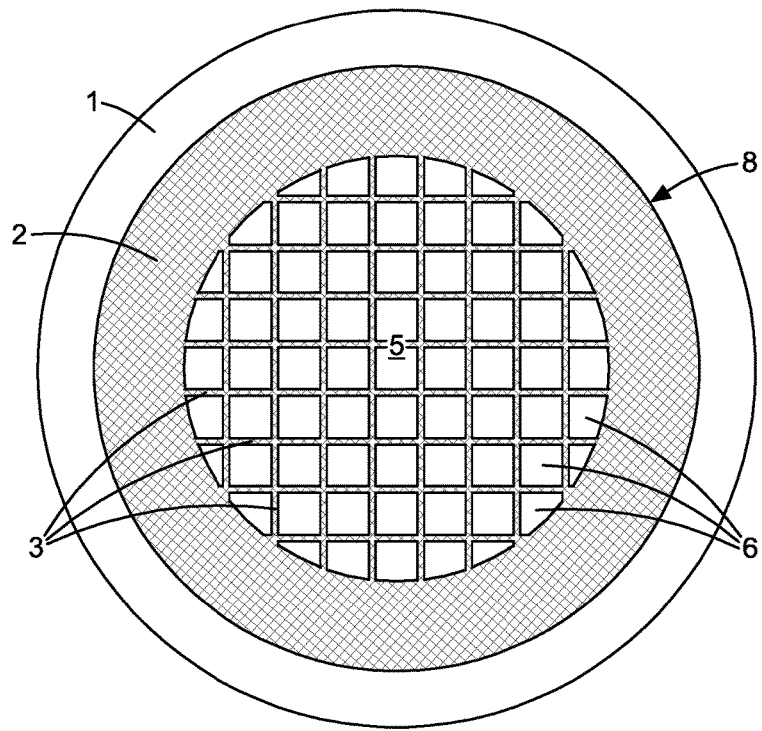
Prior Art Fig. 4

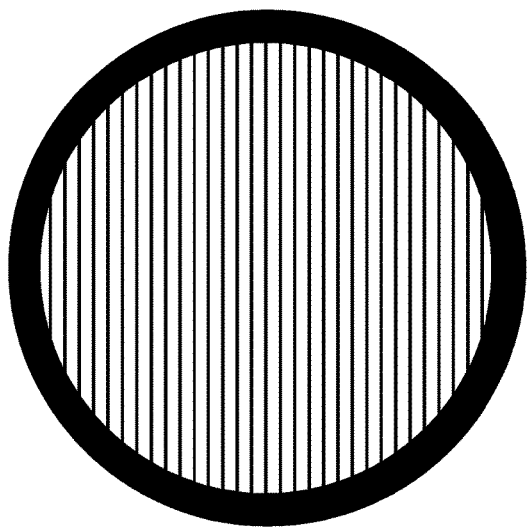
Prior Art Fig. 6A
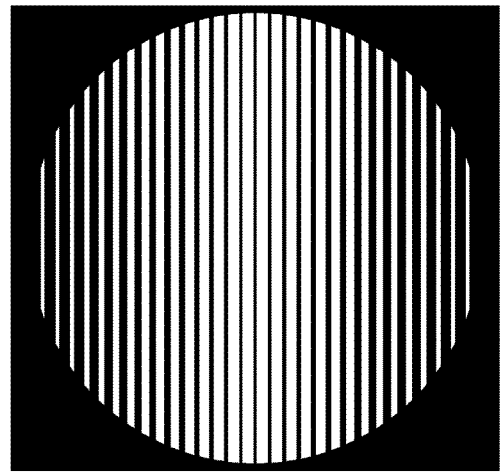
Prior Art Fig. 6B
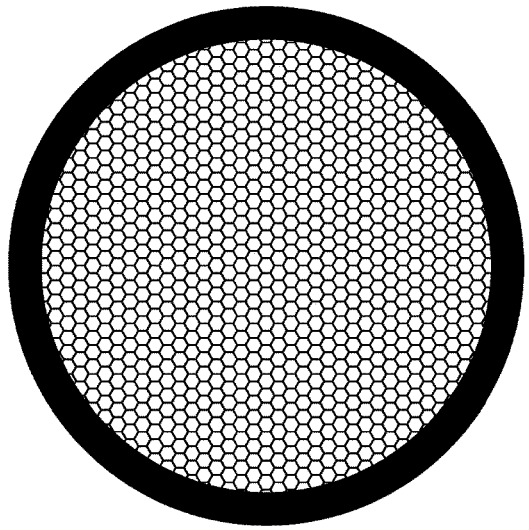
Prior Art Fig. 7A
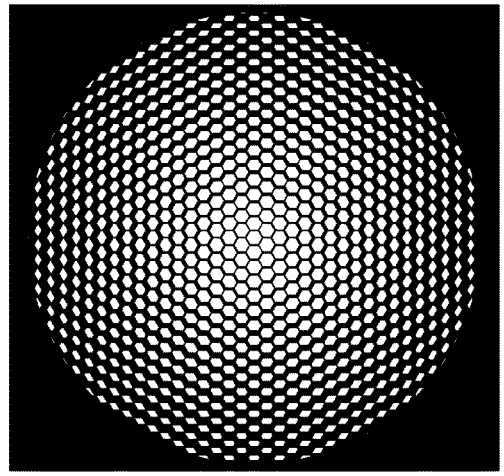
Prior Art Fig. 7B

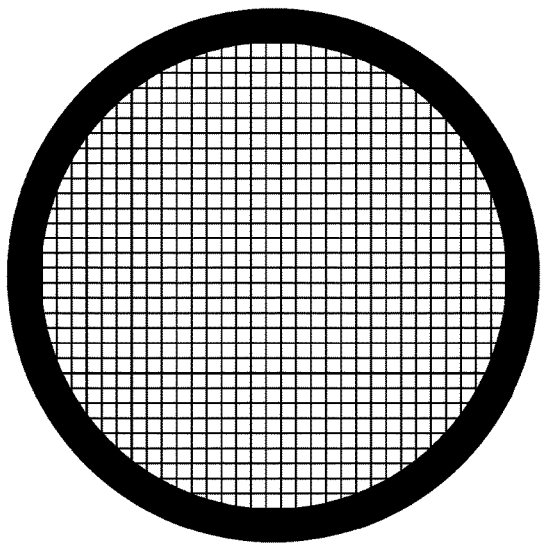
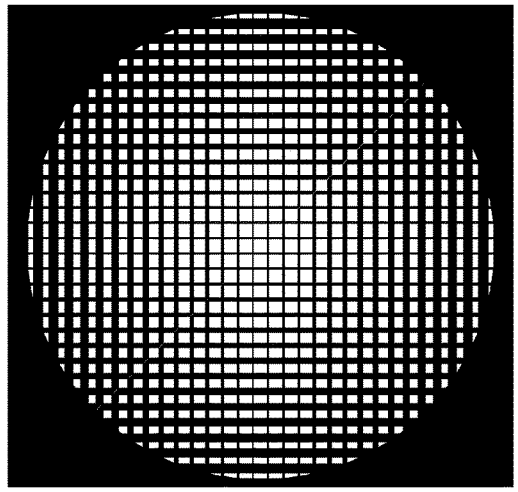
Prior Art Fig. 8A    Prior Art Fig. 8B
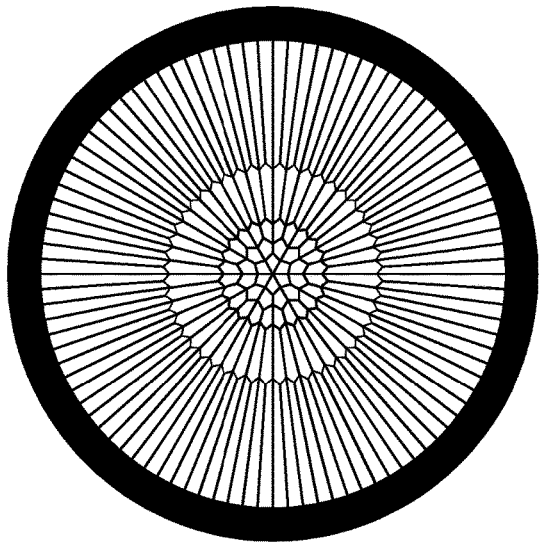
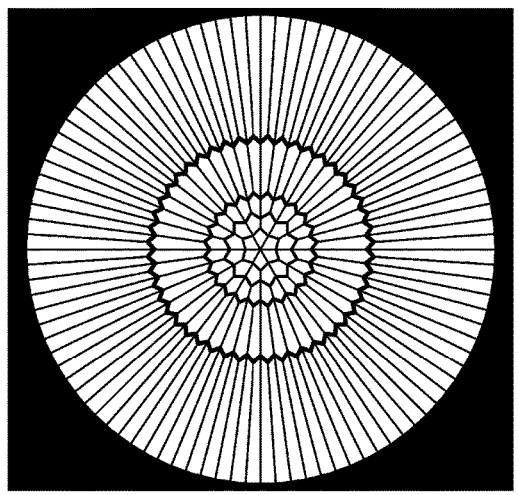
Fig. 9A    Fig. 9B

HIGH-PERFORMANCE, LOW-STRESS SUPPORT STRUCTURE WITH MEMBRANE

CLAIM OF PRIORITY

This application claims priority of U.S. Provisional Patent Application Ser. No. 62/181,932, filed 19 Jun. 2015, which is incorporated herein by reference.

TECHNICAL FIELD

The present invention relates to membranes coupled with mechanical support structures, and to devices employing the same.

BACKGROUND ART

As used herein, the term "membrane" refers to a class of mechanical elements that are relatively thin in comparison to their lateral dimensions and are insufficiently self-supporting in the applications or environments in which they are being used, whether or not such elements are traditionally referred to as "membranes" in such contexts. Membranes coupled with mechanical support structures find use in many different applications, including without limitation the following: radiation windows; filtration applications for solids, liquids, and/or gases (such as reverse osmosis membranes); dialysis applications (such as artificial kidneys); pharmaceutical processing; chromatography; biomolecular separation and purification; selective gas purification (such as thin-membrane uranium enrichment processing); biotech engineering applications (such as artificial lungs and hearts); pressure transducer applications (such as baratrons, microspeakers, microphones, and hydrophones); functionalized-membrane sensor applications; microfluidic applications (such as membrane valves and pump diaphragms); piezoelectric membrane applications; adaptive optics (such as MEMS membrane deformable mirrors); space applications (such as solar wind sails and solar cells); supported telescope mirrors; supported inflatable structures (such as balloons, dirigibles, blimps, and parachutes); and weather protections (such as umbrellas, tents, awnings, and canopies). Although these applications may employ terms other than "membrane" for the relatively thin element and terms other than "support structure" for the supporting element, for convenience of discussion said elements will be collectively referred to herein by the general terms "membrane" and "support structure." Because this invention was first conceived in the context of radiation windows, it will be convenient to discuss the background of the invention in that particular context, but this contextual emphasis is by no means intended as a limitation on the scope or applicability of the invention, as the same engineering issues and constraints that make this invention beneficial in the context of radiation windows also make it beneficial in the context of numerous other applications involving membranes coupled with mechanical support structures.

A radiation window is a physical structure that transmits incident radiation (e.g., gamma rays, X-rays, ultraviolet light, infrared radiation, alpha particles, beta particles, electrons, protons, neutrons, etc.) while blocking unwanted species (e.g., gases, liquids, mobile solids, visible light, other radiation, etc.). When the primary purpose of such a structure is to selectively transmit certain radiation while blocking other radiation, the structure is often referred to as a "filter." As used herein, the term "window" refers to all such radiation-transmitting structures, regardless of what species they are intended to block.

Radiation windows are typically employed in devices that produce, detect, and/or analyze radiation. By way of example, X-ray florescence (XRF) devices, energy dispersive spectroscopy (EDS) devices, and X-ray diffraction (XRD) devices, all of which provide information about the elemental and/or structural composition of a material specimen by analyzing X-rays emitted from the specimen after it has been subjected to irradiation, typically employ an X-ray detector encased in a protective housing with a radiation window that allows the X-rays to enter the housing and reach the detector. In such applications, the radiation window is commonly referred to as an "X-ray window." Common examples of X-ray detectors used in such applications are silicon drift detectors (SDD), quantum dot detectors (QDD), silicon-lithium (SiLi) detectors, and PIN diodes. Such detectors must typically be cooled substantially below room temperature to reduce electronic noise and improve performance. To protect the detector from degradation caused by environmental contaminants, the detector is typically sealed inside the protective housing under high vacuum or, alternatively, filled with a small amount of gas under partial vacuum. The vacuum or partial vacuum inside the detector housing is also important to minimize the attenuation of low-energy X-rays (often referred to as "soft X-rays"), which are easily absorbed by gas molecules.

There are many other applications for radiation windows, but two competing requirements common to most of them are that the windows must be thin enough to transmit the desired radiation with as little absorption or attenuation as reasonably possible while at the same time being robust enough to withstand whatever forces may be exerted on the windows (by differential pressures, mechanical vibrations, accelerations, etc.) without breaking or otherwise losing integrity, such as developing cracks or fissures that allow unwanted gases, radiation, or other species to leak through the window. These two competing requirements become increasingly problematic when the desired radiation is easily absorbed by any kind of solid matter, such as the case of soft X-rays emitted from irradiated "light elements" (i.e. elements of low atomic number, such as Li, B, C, N, O, and F), which have difficulty penetrating even extremely thin—and therefore very fragile—windows.

Thin radiation windows are usually made of materials composed primarily of relatively light elements, since such elements are typically less absorptive, and thus more transmissive, of weakly-penetrating radiation. Thin window materials used in the prior art include beryllium, aluminum, diamond, mica, quartz (silicon dioxide), boron, boron hydride composition, boron nitride, silicon nitride, and polymers such as polyimide, polypropylene, polyethylene, polyester, polycarbonate, polyvinyl formal, and polyparaphenylene terephthalamide (sold under the trademark Kevlar®). The window materials are fashioned into thin foils or films (hereinafter referred to collectively as "membranes") which are attached across an opening in a more mechanically robust structure or housing (hereinafter "window housing"). Polymers are often the membrane material of choice for extremely thin radiation windows (on the order of a few microns or less), primarily because they are less dense—and therefore more transmissive—than most other window materials, and because thin polymer membranes are typically less brittle than similarly transmissive membranes of other window materials. However, because thin polymer membranes are very permeable to gas molecules, they must be coated with a gas barrier layer (for example, a few hundred angstroms of aluminum) for applications which require a gas-tight window, such as the X-ray detectors mentioned above. Polymer membranes may also require thin coatings of non-polymeric materials for other purposes, including radiation filtration (such as a metallic layer on an X-ray window to filter out unwanted ultraviolet, visible, and/or infrared radiation) and electrical properties (such as a thin metallic coating to provide electrical conductivity on windows used in "proportional counter" radiation detectors).

In many applications, especially those in which the window must withstand substantial forces acting on it—such as where there is atmospheric pressure on one side of the window and vacuum on the other side—a free-standing membrane of the window material may not be strong enough to span the opening in the window housing. In such situations, it is customary to employ a support structure, such as a rigid mesh or grid, to provide mechanical support for the window membrane. The primary design goals for such a support structure are to provide the requisite mechanical strength and rigidity to support the window membrane while interfering as little as possible with the transmission of the desired radiation.

As illustrated by way of examples in Prior Art FIGS. 1-4, support structures come in many different geometries and configurations, but common to all of them is a transmissive area 5 comprising a pattern or array of solid members 3 (hereinafter "support members") to support the window membrane 4, and corresponding apertures 6 to allow the radiation to pass through the support structure 8. Configurations of support members 3 and corresponding apertures 6 found in the prior art include arrays of straight ribs and slots, round holes, polygonal holes (hexagons, rectangles, squares, triangles, etc.), and combinations of these. As suggested by the multiple reference lines for the support members 3 in the above-referenced Figures, the term "support member" as used herein refers to an individual segment making up the pattern or array of solid members supporting the window membrane 4, and not to the pattern or array as a whole.

Support structures also typically have a flange 2 peripheral to the transmissive area 5 for facilitating the attachment of the support structure 8 to the window housing 1. It should be noted that the flange 2 may also be transmissive of radiation, but as a general rule the flange 2 will transmit to a lesser degree than the transmissive area 5.

In the prior art, support structures have been made of relatively rigid materials such as silicon, quartz (silicon dioxide), diamond, boron, boron hydride composition, boron nitride, silicon nitride, carbon composites, and various metals including nickel, tungsten, molybdenum, stainless steel, aluminum, beryllium, and copper.

An inherent drawback of support structures is that they inevitably obscure a portion of the incident radiation, thus reducing the overall transmission or performance of the window. Another potential drawback is that the material of the support structure itself, when exposed to the incident radiation, may be induced to emit radiation of its own (to "fluoresce") which could contaminate the spectrum of the radiation passing through the window. These can be substantial drawbacks in applications where the amount of radiation transmitted and/or the spectral purity of said radiation are of concern.

One obvious way to increase the transmission of radiation through a given support structure is to modify the design of its support members 3 and/or apertures 6 so as to increase the fractional open area, defined as the aggregate area of the apertures 6 divided by the total transmissive area 5 (for reference, Prior Art FIGS. 2-4 all show support structures with a fractional open area of 75%). However, this strategy can only be carried so far, since it eventually leads to a weakened support structure that no longer has enough strength and/or rigidity to perform its critical function of supporting the window membrane.

Another way to increase the transmission of radiation through a support structure is to decrease the thickness of the support structure itself, thus decreasing the amount of radiation absorbed by the support members 3. This strategy can be particularly beneficial in applications where the window is intended to transmit radiation of varying energies or wavelengths, such as in typical XRF, EDS, or XRD systems, because although the less-penetrating radiation may still be completely absorbed (and therefore completely obscured) by the support members 3, a higher percentage of the more-penetrating radiation can potentially be transmitted through the support members 3 (and therefore only partially obscured by them). Once again, however, this strategy can only be carried so far, since it also eventually leads to a weakened support structure that no longer has enough strength and/or rigidity to perform its critical function of supporting the window membrane.

A third way to increase the transmission of radiation through a support structure is to fabricate it from a material that is less absorptive of the incident radiation. This strategy can also address the problem of spectral contamination, since a material that is less absorptive of the incident radiation is also less likely to become excited by it and induced to emit radiation of its own. However, this strategy is quite problematic, since materials that are less absorptive are also typically less mechanically robust and rigid. For example, support structures made of polymers have been proposed (see e.g., U.S. Pat. No. 5,578,360 to Viitanen), since polymers are less brittle and more transmissive than other materials currently in use, but their relative non-rigidity has prevented them from being generally adopted. Simply put, if the support structure flexes or deforms too much, it results in failure of the window membrane.

The issues and concerns described above in the context of radiation windows are common to many applications involving membranes coupled with mechanical support structures, including without limitation the applications enumerated earlier above. There is a wide-spread need for membranes coupled with mechanical support structures that are either more transmissive, more robust, thinner, lighter, and/or of larger areas than are currently achievable.

SUMMARY OF THE DISCLOSURE

In International Patent Application Pub. No. WO 2013/138258 (now U.S. Pat. No. 9,299,469 and U.K. Pat. No. GB2514984), which is incorporated herein in its entirety by this reference, the inventors previously disclosed in the context of radiation windows a means of achieving increased transmission of flux through a membrane coupled with a mechanical support structure, specifically by introducing a "transition region" between the transmissive area of the support structure and the flange, said transition region having generally greater mechanical rigidity than the transmissive area (hereafter referred to as the "primary transmissive area" to clearly distinguish it from the transition region, which is typically also transmissive, although to a lesser degree) and generally lesser mechanical rigidity than the flange, thereby providing an intermediate rigidity transition between the dissimilar rigidities of the primary transmissive area and the flange. Note that this solution is applicable only to support structures that are flexible (i.e. non-rigid) in the context of their intended use, because it requires that there be a non-insignificant difference between the rigidity of the primary transmissive area and the rigidity of the flange. Support structures that do not experience non-insignificant flexing or deformation during their intended use—whose flange and primary transmissive area are thus for all relevant purposes as if they were completely rigid—present no opportunity to introduce a transition region of intermediate rigidity between the flange and the primary transmissive area. As disclosed in that application, the introduction of such a transition region allows support structures to be made thinner and/or with greater fractional open area and/or with less absorptive, less mechanically robust materials than prior-art support structures because it reduces the severity of the bending or deformation of the support structure occurring near the interface between the transmissive area and the flange, thus reducing the stress concentrations on the membrane in this otherwise high-stress, high-strain, failure-prone region.

The inventors now disclose herein another invention that, by itself or in conjunction with their invention disclosed in WO 2013/138258, enables membranes coupled with mechanical support structures to be made more transmissive, more robust, thinner, lighter, and/or with larger areas than the prior art. Because the scope of the present invention is not limited to applications involving a transmission of some kind through the membrane and support structure, but also includes applications in which the membrane and support structure are intended for other purposes (e.g., as a barrier, insulator, reflector, sensor, substrate, etc.), the more generalized terms "supporting area" and "primary supporting area" will be used in favor of the terms "transmissive area" and "primary transmissive area," respectively, in the subsequent discussion.

In one embodiment, a support structure comprises a plurality of support members and at least one flange, said plurality of support members comprising a plurality of sets of spoke-like support members. A first set comprises a plurality of spoke-like support members that extend generally from at least one flange toward a common hub. Each spoke-like support member of this first set comprises a distal end located farther from the hub and joined directly or indirectly to at least one flange, and a proximal end located nearer the hub and joined directly or indirectly to the proximal end of each other spoke-like support member of this first set. The spoke-like support members also include at least one subsequent set, each such set comprising a plurality of spoke-like support members that are distributed between circumferentially adjacent pairs of spoke-like support members from the prior sets and that extend generally from at least one flange toward the hub. Each spoke-like support member of each such subsequent set comprises a distal end located farther from the hub and joined directly or indirectly to at least one flange, and a proximal end located nearer the hub and connected to the nearest circumferentially adjacent pair of spoke-like support members from the prior sets via a pair of approximately straight anchoring support members, said anchoring support members joining together and forming an angular joint at or near said proximal end, said angular joint defining an angle smaller than 180 degrees with the vertex thereof pointing generally away from the hub.

Membranes coupled with mechanical support structures according to the present invention can advantageously be made from any or all of the materials which are, or could be, used in existing membranes and support structures, as well as other materials that may not be mechanically well-suited for existing membranes and/or support structures.

BRIEF DESCRIPTION OF DRAWINGS

Understanding of the present invention and the various aspects thereof will be facilitated by reference to the accompanying drawing figures, provided for purposes of illustration only and not intended to define the scope of the invention. These drawings are not necessarily to scale.

Prior Art FIG. 1 illustrates a cross-sectional view of a prior-art radiation window with support structure, attached to a window housing;

Prior Art FIGS. 2-4 illustrate alternative top views of the prior-art radiation window and housing of Prior Art FIG. 1, with the membrane removed to reveal examples of various prior-art support structures (which are shaded in each figure for clarity);

Prior Art FIGS. 6-8 illustrate (A) top views of various prior-art support structures of identical size, thickness, and fractional open area, and (B) the flux transmitted through those support structures from a nearby on-axis point source (or, viewed alternatively, the shadowing of the transmitted flux by those support structures);

FIG. 9 illustrates (A) a top view of one embodiment of a support structure according to the present invention having identical size, thickness, and fractional open area as the prior art support structures of Prior Art FIGS. 6-8, and (B) the flux transmitted through this support structure from an identically positioned on-axis point source (or, viewed alternatively, the shadowing of the transmitted flux by this support structure);

DEFINITIONS

Figure 5:
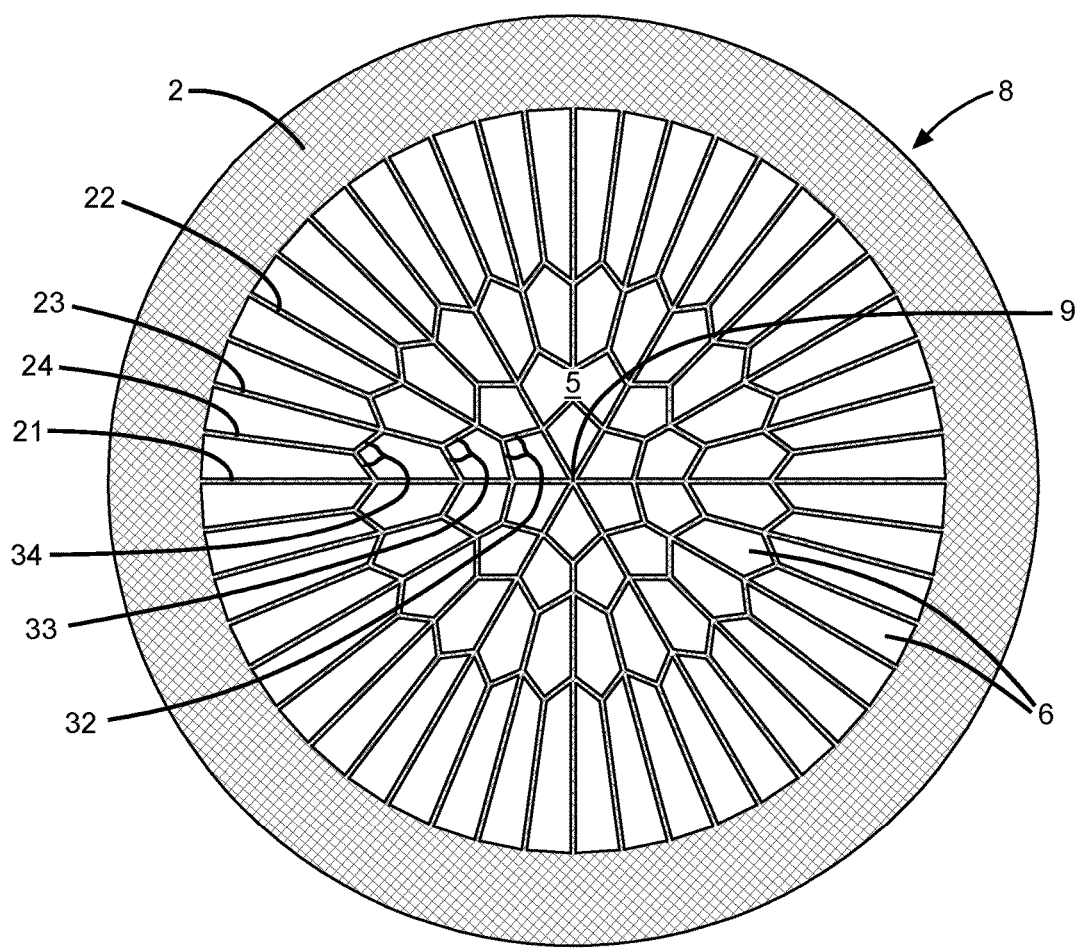
FIG. 5 illustrates a top view of a relatively basic embodiment of a support structure according to the present invention.

When geometrical terms such as the following are used to describe the various features or aspects of the invention, including in the claims, said terms are not to be interpreted as meaning exactly those geometries, but are expressly meant to be interpreted as approximately those geometries: circle, circular, center, centrally, axial, axially, vertical, vertically, radial, radially, circumferential, circumferentially, lateral, laterally, straight, parallel, plane, planar, point, polygon, polygonal, ellipse, elliptical, elliptically, oval, annulus, annular, and epicycloid.

As used herein, the term "approximately" is broader than, and expressly includes, the term "substantially."

As used herein, the "axis" of a support structure refers to an imaginary line passing through the geometrical center of the support structure and oriented normal to the supporting surface at that point, or if there is no supporting surface at that point, normal to an appropriate interpolation or extrapolation of the supporting surface at that point.

As used herein, "vertical" refers to a direction normal to the supporting surface of the support structure at the relevant location. For reference, the vertical direction in Prior Art FIG. 1 is directly toward the top of the page for any given point on the support structure.

As used herein in relation to a support structure or portion thereof, "above" means situated directly vertically from the support structure or portion thereof, on the side of the supporting surface.

As used herein, "height" refers to an extent in the vertical direction, while "length" and "width" are perpendicular to the vertical direction.

DETAILED DISCLOSURE

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention. Note that the illustrations and descriptions herein depict the support structure geometries before any deformation resulting from the application of external forces (including gravity) on the membrane. Also, in order to reduce clutter and confusion in the drawings, membranes have been omitted, and where multiple identical features appear in the same drawing typically only one of them is expressly labeled.

FIG. 5 illustrates a relatively basic embodiment of a support structure 8 according to the present invention. A primary feature of this embodiment is a plurality of spoke-like support members 21-24 in the supporting area 5 which extend various distances from a flange 2 toward a common hub 9 (in this case a point at or near the center of the support structure 8). For purposes of terminology, the two ends of a spoke-like support member will be identified according to their proximity to the hub 9, with the end that is nearer to the hub 9 being referred to as the "proximal end," and the end that is farther from the hub 9 being referred to as the "distal end." In this particular illustration, there is a first set of spoke-like support members comprising six spoke-like support members 21 which extend the full distance from the flange 2 to the hub 9, with their distal ends joined to the flange 2 and their proximal ends joined to each other at the hub 9. Distributed circumferentially among the spoke-like support members 21 of this first set is a second set comprising shorter spoke-like support members 22, with one such spoke-like support member 22 of the second set disposed between each circumferentially adjacent pair of spoke-like support members 21 of the first set (in this context the geometric concept "circumferential" is centered with respect to the hub 9, which may or may not coincide with the center of the support structure 8 as a whole). The spoke-like support members 22 of this second set do not extend the full distance to the hub 9, but each is instead connected at or near its proximal end to the nearest circumferentially adjacent pair of spoke-like support members 21 of the first set via a pair of straight support members 32 (hereinafter "anchoring" support members) which meet together in an angular joint at or near said proximal end, with the vertex of said angular joint pointing generally away from the hub 9. (The terms "straight" or "approximately straight" as used to describe anchoring support members mean only that they follow an approximately straight line when viewed from vertically above the anchoring support members, but not necessarily when viewed from the side, since they can advantageously be curved or otherwise profiled in the vertical direction.) This pattern continues in a repeating fashion with successive sets of successively shorter spoke-like support members (23 and then 24) distributed in a similar fashion among the longer spoke-like support members from the prior sets (21-22 and 21-23, respectively), with each spoke-like support member (23 and 24) connected at its proximal end to the nearest pair of longer circumferentially adjacent spoke-like support members from the prior sets (21-22 and 21-23, respectively) via a pair of anchoring support members (33 and 34, respectively) as described above.

Although the number of sets, or repetitions, of spoke-like support members illustrated in FIG. 5 happens to be four, this is by no means intended as a limitation on the invention, since there can advantageously be fewer or more such sets, or repetitions. Similarly, although the number of spoke-like support members 21 depicted in the first set happens to be six, any plural number can advantageously be used, limited only by the geometrical and other constraints of the application. Also, although the angle formed at the joint of each anchoring support member pair 32-34 in this illustration happens to be 90°, which has been found to be an advantageous angle for certain applications, the angle can advantageously be substantially less or substantially greater than that, but it must be less than 180°. In practice, angles between 7° and 173° are generally to be preferred for most applications. Moreover, a multiplicity of different angles could be employed in the same support structure, either in a symmetric or asymmetric arrangement. Additionally, the support members in any given set, as well as the anchoring support members in any given pair, need not be identical, but can advantageously vary from one another in length, width, height, cross-section, relative angles, material composition, etc. Further, the support structure can be fabricated as a single, integral unit, or as separate parts that are subsequently joined together, which joining can be accomplished by means of direct bonding, adhesives, Van Der Walls forces, fasteners, interlocking features, soldering, brazing, welding, glass frits, eutectics, ultrasonic bonding, thermosonic bonding, thermocompression bonding, diffusion bonding, anodic bonding, reactive bonding, plasma activated bonding, or any other known method or methods.

Still referring to FIG. 5, a beneficial feature of this novel support structure 8 is that it provides different numbers of spoke-like support members 21-24 at different distances from the hub 9, such that there are more spoke-like support members farther from the hub 9 where the circumference is larger, and fewer spoke-like support members closer to the hub 9 where the circumference is smaller. By judicious selection of the number of sets of spoke-like support members, the number of spoke-like support members 21 in the first set, and the locations at which the proximal ends of the spoke-like support members in each successive set are connected via their respective pairs of anchoring support members, one can control the sizes of the resulting apertures 6 so as to achieve an optimum balance between maximum transmissivity (or other figures of merit which benefit from wider or larger apertures) and minimum stress or deformation experienced by the membrane (or other figures of merit which benefit from narrower or smaller apertures). The inventors have demonstrated that this novel support structure produces substantially lower stresses in the supported membrane than comparably transmissive prior-art support structures, particularly in the non-rigid domain (i.e., those combinations of physical design, material composition, and applied forces that produce non-insignificant deformation of the support structure). This invention therefore enables mechanical support structures to be pushed even further into the non-rigid domain, meaning that they can be made thinner, with greater fractional open areas, with more transmissive materials, and/or with larger supporting areas than in the prior art. Further, this invention allows support structures to be made with less material and/or lighter materials, which can be advantageous even in cases where transmission through the support structure is not an issue, but where the weight of the support structure and/or the quantity and/or composition of the support structure material may be an issue.

In addition to the advantages identified above, this novel support structure provides even further transmission advantages over the prior art for cases involving an incident flux that is non-parallel to the axis of the support structure. Such cases often involve substantial transmission losses due to the "Venetian blind" effect. For example, the most common scenario encountered with radiation windows is that of a flux emanating outward from an approximately point source, which is typically located as close to the window as the physical geometry of the application will allow, so as to capture as much of the flux as possible through the window. Prior Art FIGS. 6A, 7A, and 8A depict various prior-art support structures of identical size, thickness, and fractional open area, while Prior Art FIGS. 6B, 7B, and 8B depict the flux transmitted through those same support structures from a nearby on-axis point source (the light areas correspond to the transmitted flux, while the dark areas correspond to the shadowing of the flux by the support structures). For comparison, FIGS. 9A and 9B depict an identical setup with a support structure according to the present invention, showing how much more of the flux is transmitted (or, stated alternatively, how much less of the flux is shadowed) by this novel support structure. Note that these figures do not convey the full benefit of the invention because they do not take into account the other advantages identified above, namely that the invention enables the support structure to be made thinner and/or with greater fractional open area than prior art support structures, thereby further increasing the transmission (or reducing the shadowing) over what is depicted in FIG. 9B.

Figure 10:
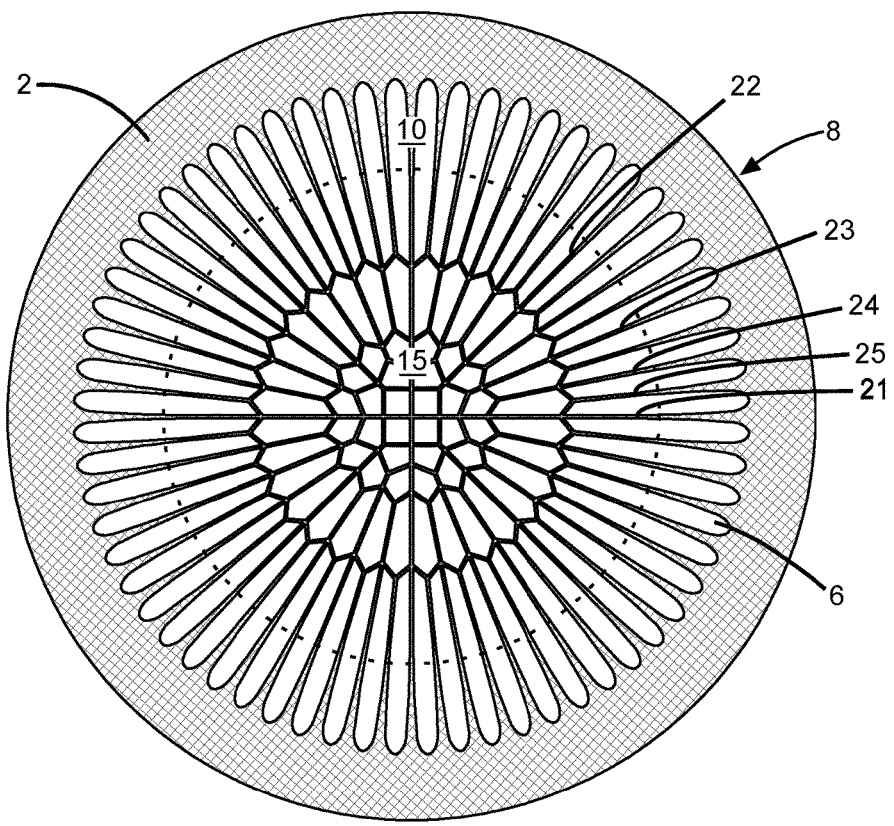
FIGS. 10-17 illustrate top views of support structures according to various embodiments (but only a partial top view in FIG. 12)

As indicated above, the support structure of the present invention can also advantageously comprise a transition region as disclosed in WO 2013/138258, thereby further reducing the stress concentrations on the membrane in the critical region between the flange and the primary supporting area. By way of example, FIG. 10 illustrates an embodiment with a transition region 10 disposed between a flange 2 and a primary supporting area 15 (the area contained within the dashed circle). The transition region 10 appears as a more-or-less continuous widening of the distal ends of the spoke-like support members 21-25 as they approach the flange 2, producing a roughly elliptical shape at the end of the apertures 6 nearest the flange 2. However, as defined herein, the transition region and the spoke-like support members are deemed to be separate features; thus, the spoke-like support members 21-25 are deemed to terminate at the innermost boundary of the transition region 10 (indicated by the dashed circle), such that the distal ends of the spoke-like support members 21-25 are not joined directly to the flange 2, but are joined indirectly to the flange 2 via the transition region 10. Of course, other geometries and/or means can be used to produce the transition region 10, as disclosed in WO 2013/138258, a number of which are illustrated by way of example in the subsequent figures herein (not all of which are expressly labeled, however, in an effort to avoid clutter and confusion in the drawings). Note, however, that geometry alone is not sufficient to create a transition region, because the concept of a transition region is not defined in terms of geometry but in terms of mechanical rigidity, which is a composite property of material and geometry. Specifically, the transition region 10 must have generally greater mechanical rigidity than the primary supporting area 15 and generally lesser mechanical rigidity than the flange 2, thereby providing an intermediate rigidity transition between the dissimilar rigidities of the primary supporting area 15 and the flange 2. Note also that the particular embodiment illustrated in said FIG. 10 provides an example of five sets, or repetitions, of spoke-like support members 21-25, with four spoke-like support members 21 in the first set.

Figure 11:
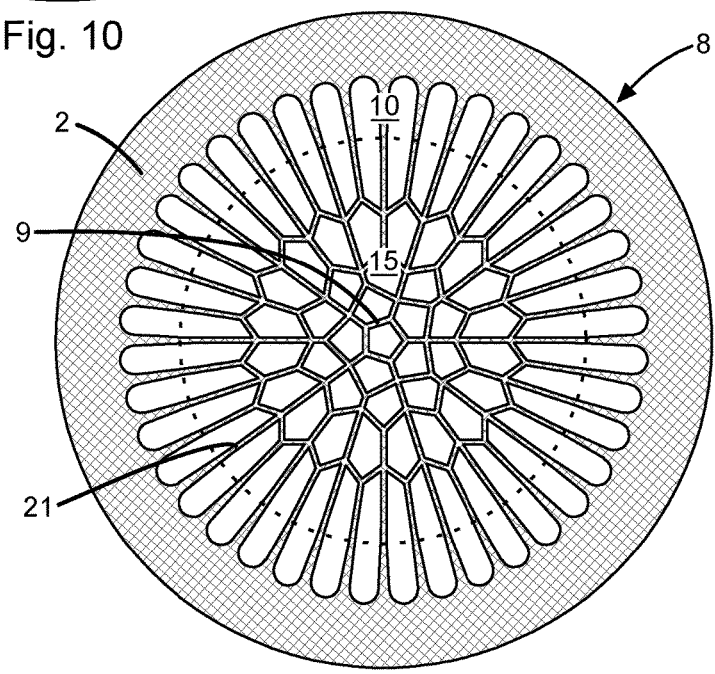

It should be emphasized that the hub need not be a simple point, but can advantageously have spatial extent, as illustrated by way of example in FIG. 11. In this embodiment, the proximal ends of the spoke-like support members 21 of the first set are not joined directly to each other at a single-point hub, but are instead joined indirectly to each other through a hub 9 comprising an unfilled polygon (in this case a pentagon) formed by a set of circumferentially-oriented support members. In this particular case the number of sides of the polygon matches the number of spoke-like support members 21 in the first set, but this is by no means intended as a limitation on the invention, as one skilled in the art will appreciate that other hub geometries can advantageously be implemented, including without limitation polygonal and non-polygonal geometries (e.g., circular, elliptical, oval, annular, epicycloidal, etc., and combinations thereof), filled and unfilled geometries, regular and irregular geometries, symmetrical and asymmetrical geometries, etc. Also, as illustrated in subsequent figures, the hub need not be a physical feature incorporated into the support structure, but can advantageously be a non-physical geometrical construct toward which the spoke-like support members extend but do not necessarily reach, in which case the proximal ends of the spoke-like support members of the first set will be joined indirectly to each other via other physical elements. Moreover, a support structure can advantageously comprise more than one hub. In similar manner, a support structure can advantageously comprise more than one flange, and the spoke-like support members need not be joined directly to said flange or flanges, but can advantageously be joined indirectly to a flange via other physical elements (including a transition region).

Figure 12:
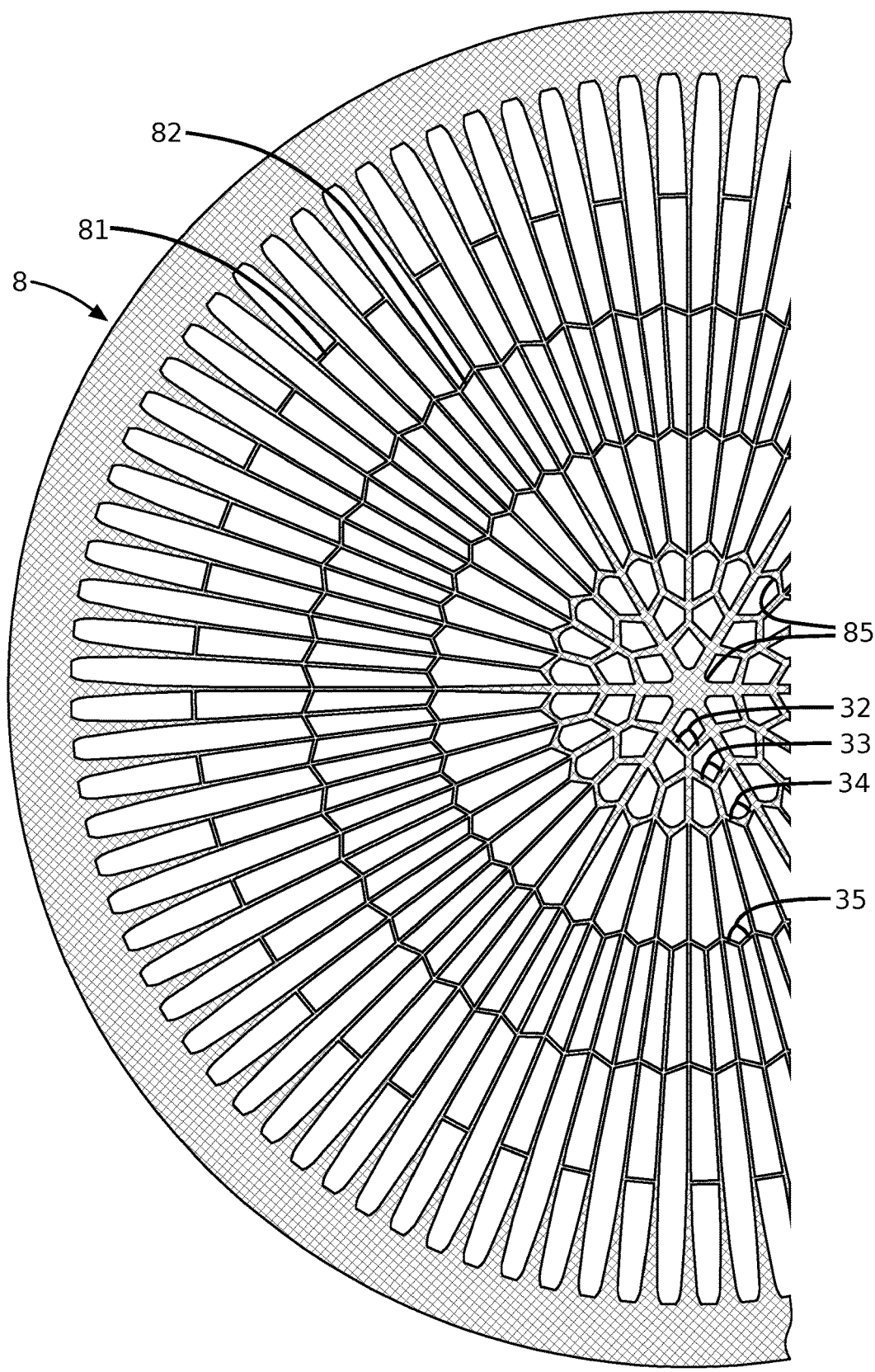
Figure 13:
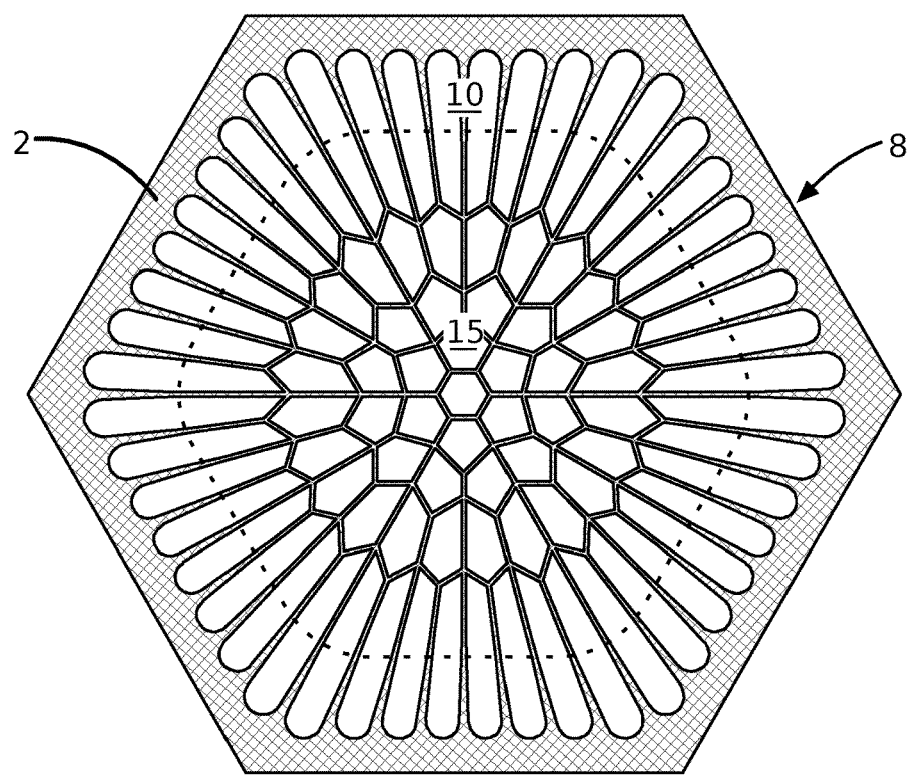
Figure 14:
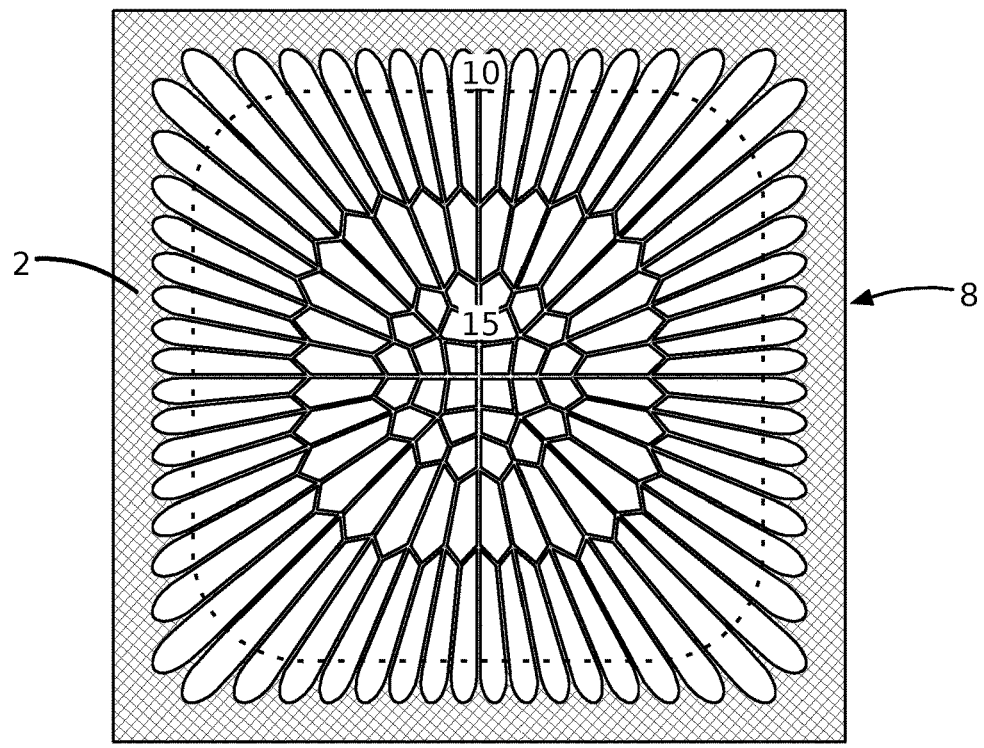

There are numerous modifications and variations of the above-illustrated sample embodiments that are within the intended scope and spirit of the invention. By way of example and not limitation, FIG. 12 illustrates advantageous variations in width of the support members, advantageous variations in the angles formed by the anchoring support member pairs 32-35 (in this case, 78°, 85°, 90°, and 110.4°, respectively), advantageous introduction of additional support members 81-82, and advantageous introduction of additional geometry/material 85 (in this case, fillets). As illustrated in this example, variations in width of the support members can occur in simple, discrete steps or in a more continuous fashion (either along the length of the support member and/or in the vertical direction), and one skilled in the art will appreciate that such variations may be linear or nonlinear. As also illustrated in this example, additional support members can be oriented circumferentially (like 81) or non-circumferentially (like 82) and can be configured to be contiguous (like 82) or non-contiguous (like 81). Similarly, although the additional geometry/material 85 shown in this example consists of circular fillets distributed symmetrically in certain locations around the support structure 8, one skilled in the art will appreciate that additional geometry/material can advantageously be introduced in a wide variety of other shapes, configurations, and locations. Moreover, any of the above-mentioned variations can be configured either symmetrically or asymmetrically.

Figure 15:
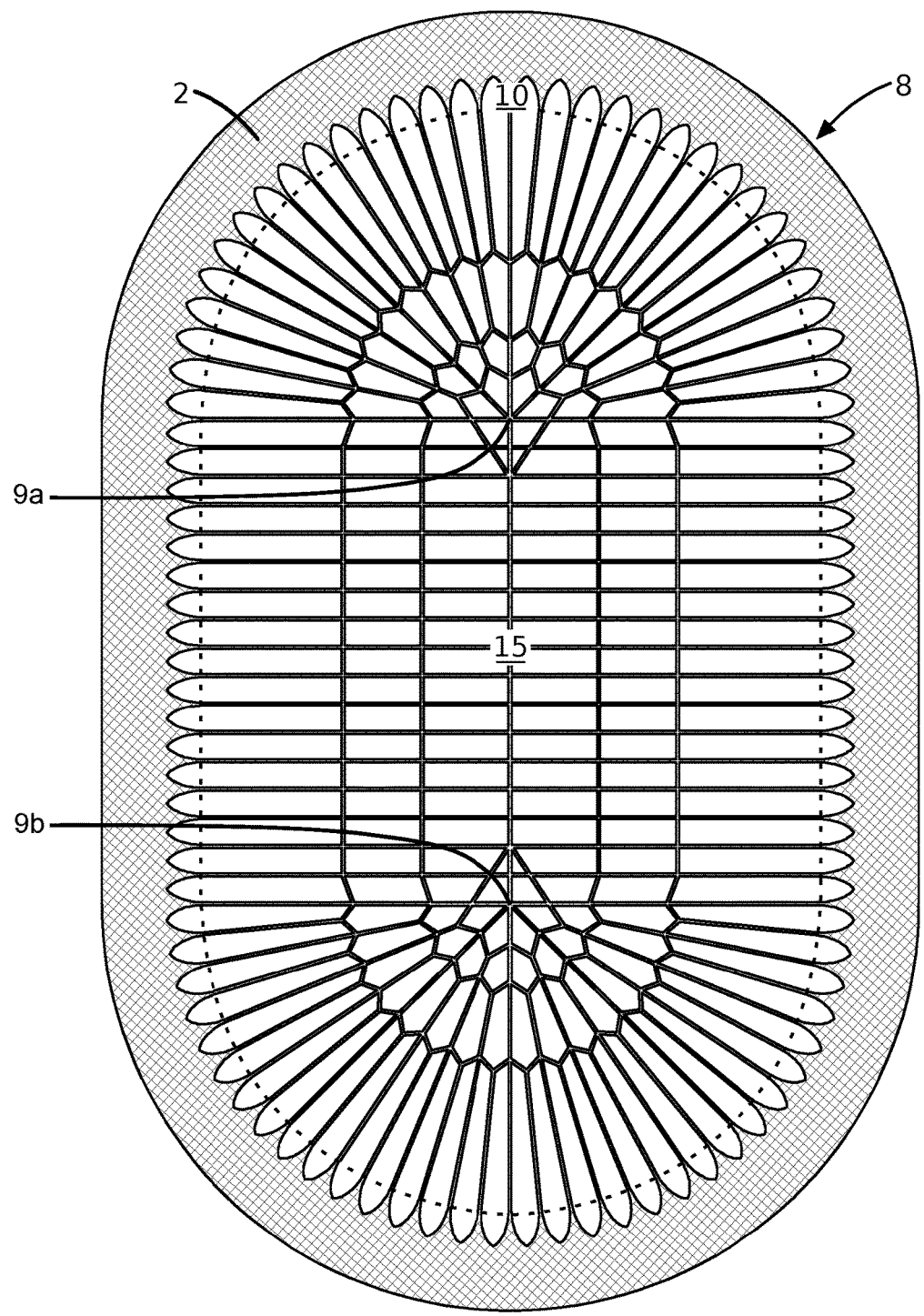
Figure 16:
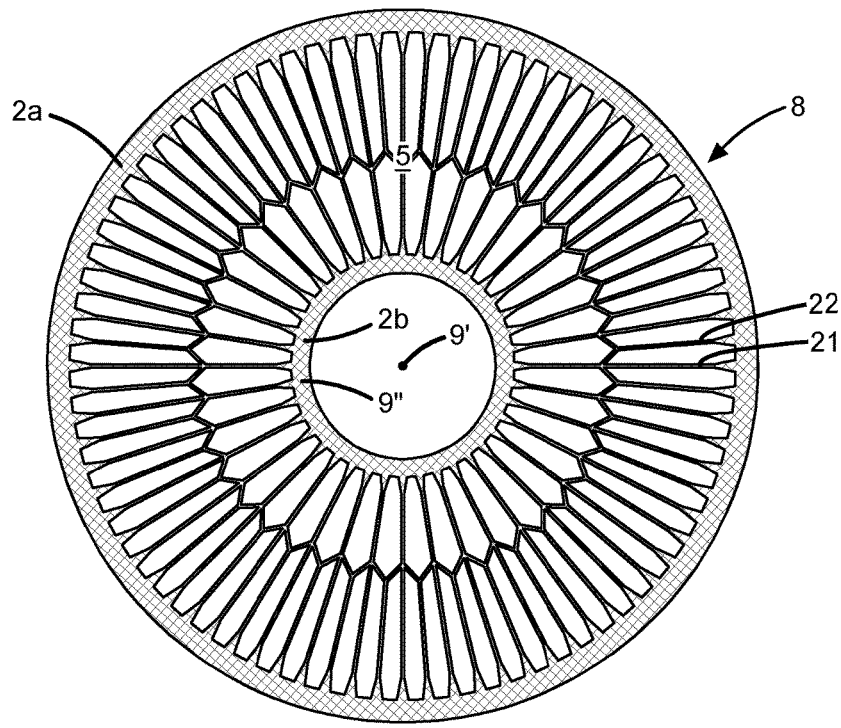
Figure 17:
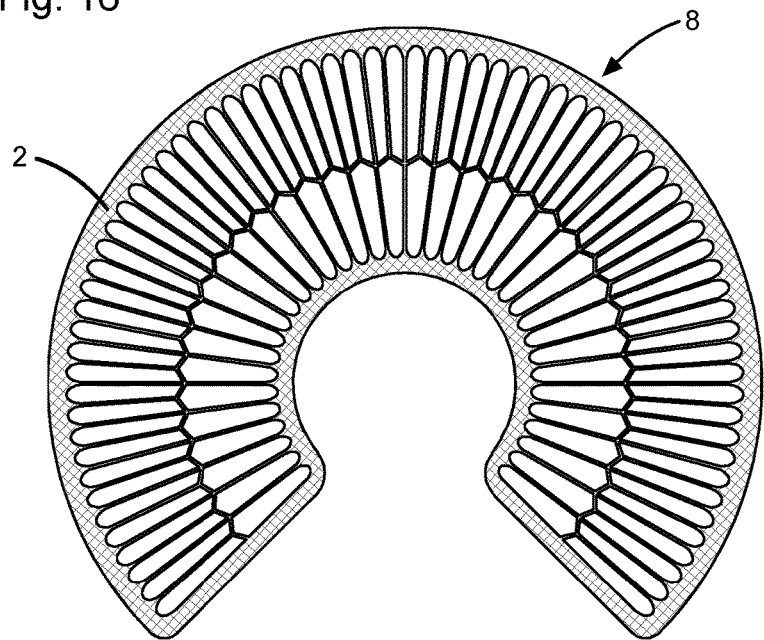

It is expressly emphasized that the present invention is not limited to configurations having a simple circular periphery, but it is also applicable to other shapes of membranes coupled with mechanical support structures, including without limitation polygons, ellipses, ovals, annuli, epicycloids, etc., as well as portions and combinations thereof, and any other geometries existing in the prior art. By way of example and not limitation, FIGS. 13-17 illustrate various non-circular embodiments of support structures according to the present invention. These embodiments also illustrate various other aspects of the invention mentioned previously. For example, FIG. 15 illustrates an embodiment comprising multiple hubs 9a and 9b, neither of which is located at the geometric center of the support structure 8. FIG. 16 illustrates an example of an annular-shaped embodiment comprising multiple, separate flanges, in this case a flange 2a on the outer periphery of the supporting area 5 and another flange 2b on the inner periphery of the supporting area 5, with transition regions (not expressly labeled) advantageously incorporated along both of said flanges 2a and 2b. In this embodiment, the hub can validly be viewed in at least two alternate ways: (1) there is a hub 9' which comprises a non-physical point located at or near the geometric center of the support structure 8, toward which the spoke-like support members 21-22 extend but do not actually reach, and the proximal ends of the spoke-like support members 21 of the first set are joined indirectly to each other via physical elements that are not the hub 9', namely the transition region and then the innermost flange 2b; or (2) there is a hub 9" which is synonymous with the innermost flange 2b, in which case the hub 9" is a physical feature with spatial extent, toward which the proximal ends of the spoke-like support members 21 of the first set extend, and through which (in conjunction with the transition region) they are indirectly joined to each other. FIG. 17 illustrates a similar example embodiment with a partial-annular configuration, which entails many of the same or similar aspects as the full-annular embodiment illustrated in FIG. 16, but it notably comprises just a single, contiguous flange 2 running around the entire periphery of the support structure 8.

Figure 18:
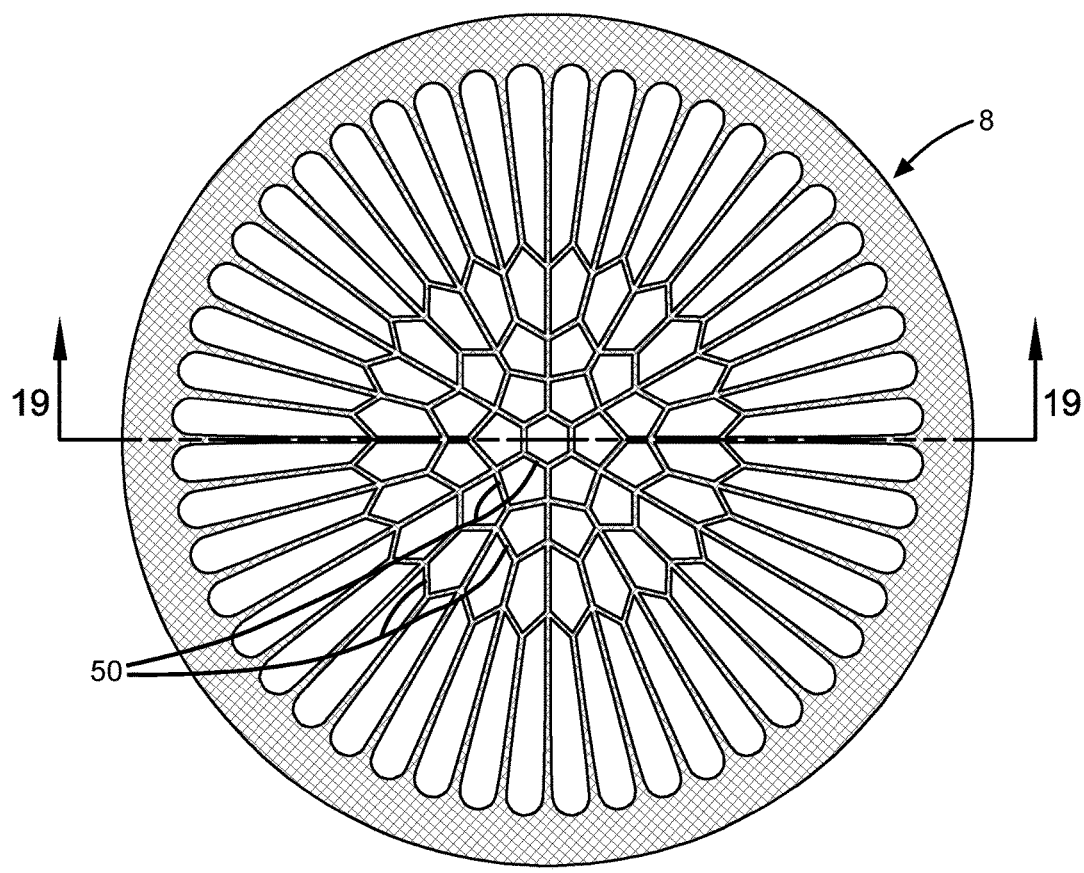
FIG. 18 illustrates a top view of a support structure according to one embodiment, in which the supporting surface is concave, the opposite surface is convex, and the sidewalls of the support members are aligned toward the center of curvature of the supporting surface.
Figure 19:
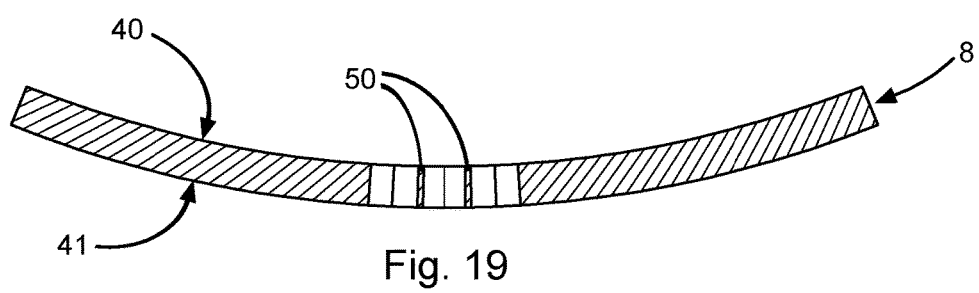
FIG. 19 illustrates a cross-sectional view of the support structure of FIG. 18.

The present invention is also expressly not limited to planar support structure geometries, but the support structure can advantageously be configured such that its supporting surface is non-planar and/or its opposite surface is non-planar. By way of example and not limitation, either or both of said surfaces can advantageously be made concave, convex, and/or undulating to improve the transmissive and/or mechanical properties of the structure. FIGS. 18 and 19 illustrate by way of example an embodiment of a support structure 8 according to the present invention in which the supporting surface 40 is concave, the opposite surface 41 is convex, and the sidewalls of the non-spoke-like support members 50 (in this case comprising the anchoring support members plus six circumferentially-oriented support members configured to form an unfilled hexagonal hub) are not aligned with the axis of the support structure (as defined above) but are aligned toward the center of curvature of the supporting surface 40. This example embodiment has been found to produce measurably lower stresses in the support structure and membrane than comparable planar embodiments in situations where substantial deformational forces are applied to the membrane. This embodiment is also generally superior to planar embodiments in transmitting incident flux from an approximately on-axis point source, especially when the point source is located near the center of curvature of the supporting surface 40, because the sidewalls of the support members are more advantageously aligned with the incoming flux, thereby reducing the shadowing by the support members.

Figure 20:
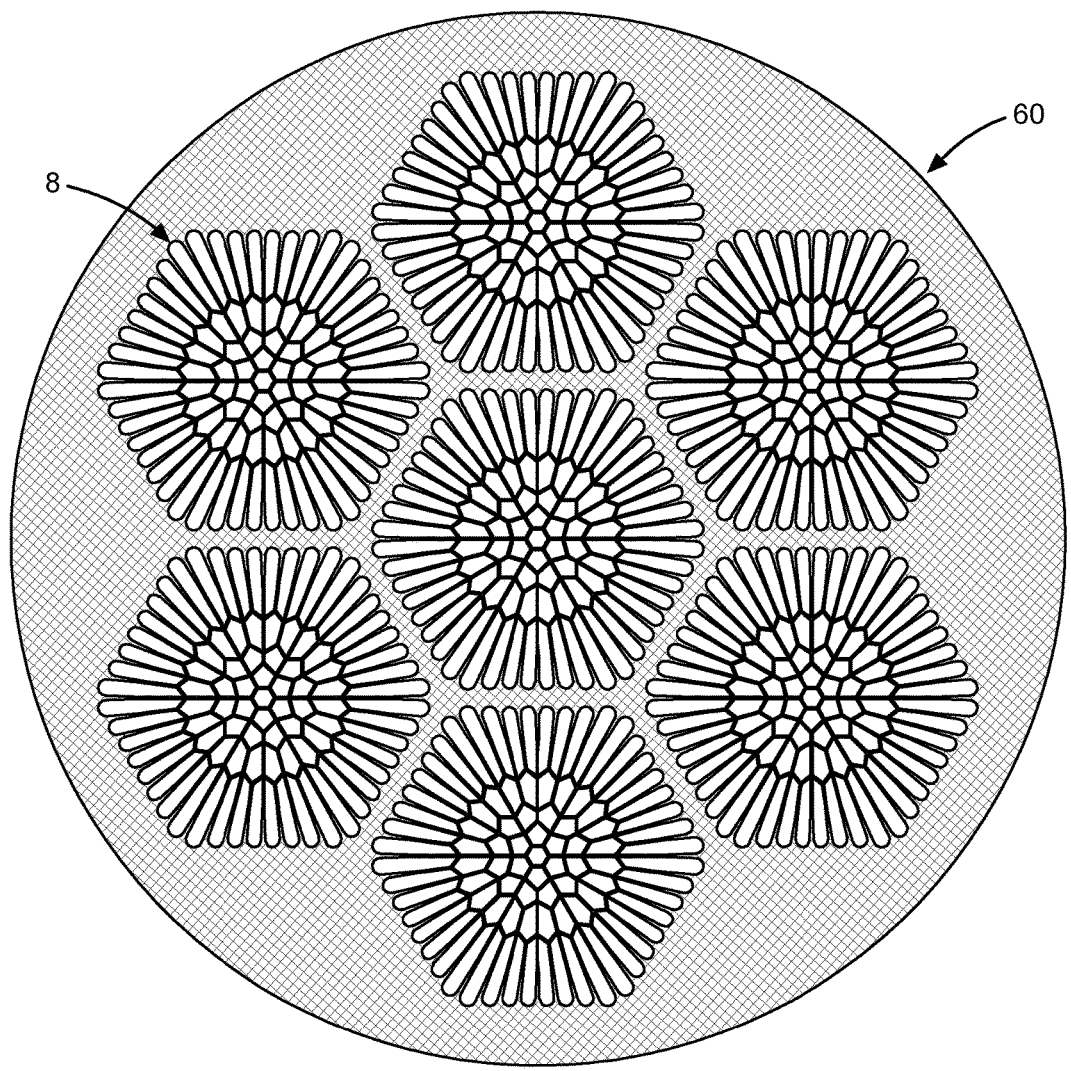
FIG. 20 illustrates a top view of a plurality of support structures grouped laterally and joined together to form a unit, according to one embodiment.

In another embodiment, a plurality of support structures 8 according to the present invention are grouped laterally and joined together (either directly or indirectly) to form a unit 60, as illustrated by way of example in FIG. 20, with one or more membranes (not shown) spanning said unit 60. One skilled in the art will appreciate that the individual support structures 8 comprising said unit 60 can advantageously be identical or varied in size, shape, thickness, material composition, configuration of support members, etc., and that they can be fabricated as a single, integral unit, or as separate parts that are subsequently joined together. Said joining can be accomplished by means of any of the aforementioned joining methods or any other known methods.

Figure 21:
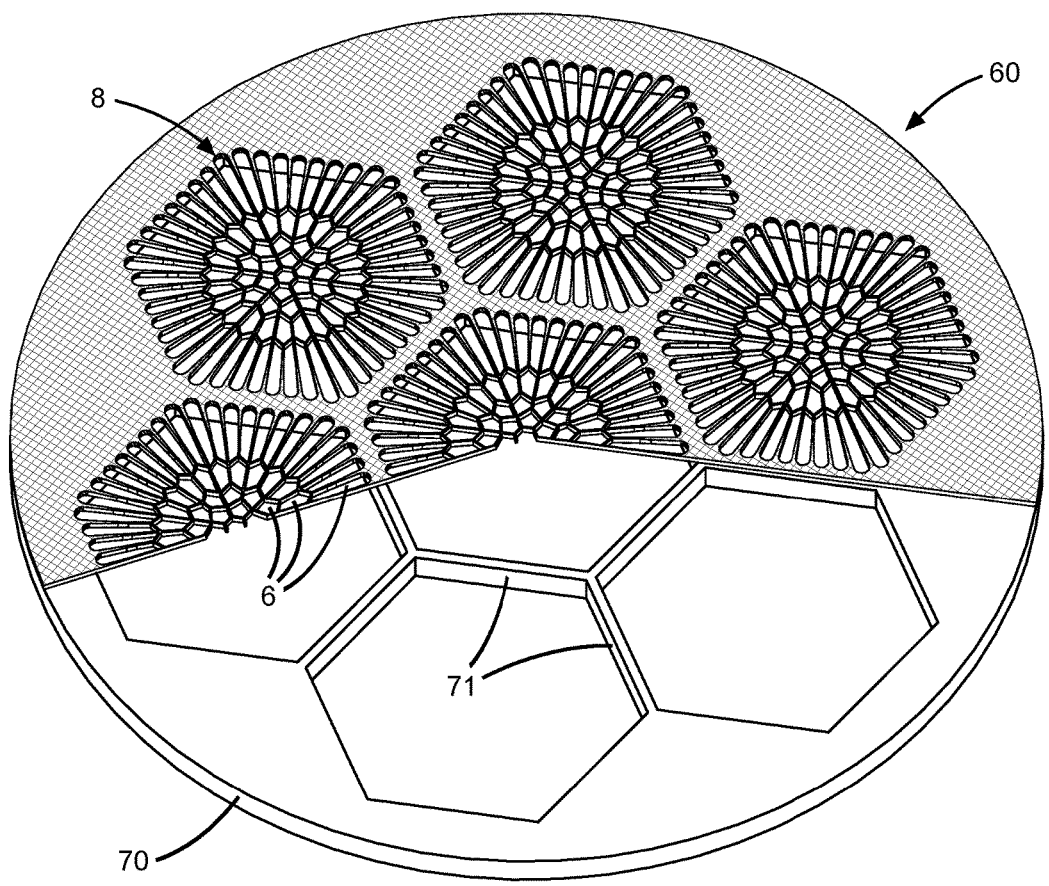
FIG. 21 illustrates a perspective cut-away view of a unit of primary support structures (shaded) supported by a secondary support structure, according one embodiment.

FIG. 21 illustrates an example of yet another embodiment, in which a unit 60 comprising a plurality of joined support structures 8 (hereinafter "primary" support structures) is further supported by a secondary support structure 70, which is typically (but not necessarily) coarser and stiffer than the primary support structures 8. This figure illustrates an example in which the support members 71 of the secondary support structure 70 are configured and aligned so as to interfere as little as possible with any flux through the apertures 6 of the primary support structures 8, thus maximizing the overall transmission through the primary and secondary support structures 8 and 70. However, many other configurations and alignments are possible and potentially advantageous. Further, the secondary support structure 70 can comprise the same material or materials as the primary support structures 8, or it can comprise a different material or materials. By way of example and not limitation, the secondary support structure 70 can advantageously comprise a stiffer and/or stronger material or materials than the primary support structures 8, such as a metallic secondary support structure 70 with polymeric primary support structures 8. Moreover, the secondary support structure 70 does not have to be generally planar as in the illustrated example, but it can advantageously be configured such that its supporting surface (the one in contact with the primary support structures 8) is non-planar and/or its opposite surface is non-planar, just as described above with respect to the primary support structures 8. One skilled in the art will appreciate that any number of additional support structures can also advantageously be added to provide further mechanical support to the primary and secondary support structures 8 and 70 described above, with each successive additional secondary support structure typically (but not necessarily) being coarser than the preceding support structure. The support structures can all be fabricated as a single, integral unit, or as separate parts that are subsequently joined together, which joining can be accomplished by means of any of the aforementioned joining methods, including without limitation a positive-acting photodefinable adhesive, or any other known methods.

In another embodiment (not illustrated), a single primary support structure according to the present invention is further supported by a secondary support structure, which is typically, but not necessarily, coarser and stiffer than the primary support structure. The exact same considerations with respect to primary, secondary, and additional secondary support structures described above apply in relation to this embodiment.

Although the most common general configuration for membranes coupled with mechanical support structures has the support structure(s) on the side of the membrane that will result in the membrane being driven against the support structure(s) by the applied force or forces, the support structure(s) can advantageously be situated on the opposite side, or on both sides, of the membrane. In embodiments comprising support structures situated on both sides of the membrane, the support structures can advantageously be identical or varied in size, shape, thickness, material composition, configuration of support members, etc. Further, the membrane and one or more support structures can be fabricated as a single, integral unit, or as separate parts that are subsequently attached or joined together, which joining can be accomplished by means of any of the aforementioned joining methods or any other known methods. In any embodiment or configuration, the membrane or membranes can advantageously be in full bonded contact with the support structure or structures, or bonded or attached to only a portion of the support structure or structures (for example, only to the flange or flanges).

Although the flanges in the above figures are illustrated for simplicity as thin rims of relatively constant width running along the periphery of the supporting area, the definition of "flange" as used herein is not limited to such simple geometries or embodiments. As used herein, the term "flange" refers to a mechanical element or elements to which the support members are joined, either directly or indirectly, and which provide support for the support members and locate and fixate them with respect to the assembly or system in which the support structure is to be used. The term "flange" is therefore to be interpreted as including such structures as are often referred to by such other terms as frame, rim, brim, mount, mounting, housing, casing, encasement, scaffolding, bracket, brace, buttress, border, edging, fringe, lip, hem, skirting, shell, etc. By way of example and not limitation, if the support members 3 of the support structure 8 in Prior Art FIG. 1 were directly joined to the window housing 1 rather than to the depicted flange 2, then the window housing 1 would be serving the role of the flange and would therefore be the "flange" within the meaning intended herein.

The support structure of the present invention can advantageously comprise any one or more solid materials that can perform the function of supporting the membrane, including without limitation any and all mechanical support structure materials known in the art. By way of example and not limitation, a support structure of the present invention for use in a radiation window (or any of many other applications) could advantageously comprise any one or more of the following materials: carbon (including without limitation amorphous carbon, diamond, diamond-like carbon, graphene, graphitic carbon, pyrolitic graphite, carbon nanotubes, etc.), carbon composites (including without limitation carbon fiber composites, carbon nanotube composites, graphene composites, etc.), boron, boron carbide, boron hydride composition, boron nitride, silicon, silicon carbide, silicon nitride, quartz, mica, glass, fiberglass, ceramic, aluminum oxide, aluminum nitride, metals (including without limitation beryllium, beryllium-copper, copper, lithium, aluminum, magnesium, nickel, tungsten, molybdenum, steel, stainless steel, chromium, titanium, palladium, platinum, gold, etc., and alloys thereof), photodefinable materials, plastics and polymers (including without limitation polyimide, polyamide, polypropylene, polyethylene, polyethylene terephthalate, polyethylene naphthalate, polyester, polyurethane, polystyrene, polycarbonate, polysulfide, polysulfone, polyvinyl chloride, polyvinyl alcohol, polyvinyl formal, poly(p-xylylene), polyparaphenylene terephthalamide, bismaleimide, nylon, polytetrafluoroethylene, polychlorotrifluoroethylene, perfluoroalkoxy alkane, other fluoropolymers, etc., and photodefinable versions of the same). Further, different regions or portions of the support structure can comprise different materials or combinations of materials.

The support structure can be fabricated using any known fabrication methods. By way of example and not limitation, a support structure of the present invention for use in a radiation window (or any of many other applications) could be fabricated by means of machining, chemical etching, electroforming, reactive ion etching, plasma etching, laser cutting, laser ablation, water jet cutting, laser microjet cutting, ion milling, electrical discharge machining (EDM), photolithography, molding, additive manufacturing (e.g., 3D printing), etc.

The support members are not limited to having straight, vertical sidewalls that are parallel to each other, but can advantageously be configured with non-straight, non-vertical, and/or non-parallel sidewalls. The support members are also not limited to being solid, but can advantageously incorporate cavities, voids, hollowed regions, etc. By way of example and not limitation, the support members can advantageously be configured with one or more of the following general cross-sectional shapes: rectangle, square, trapezoid, triangle, hexagon, other polygon, circle, oval, barrel, I-beam, T-beam, T-slot, X-beam, C-beam, channel, angle, etc., including hollowed, profiled, filleted and/or chamfered versions of the same. Moreover, the supporting surfaces and adjacent edges of the support members can advantageously be smoothed, rounded, and/or polished to eliminate rough surfaces and sharp corners so as to reduce the probability of causing wear or damage to the membrane. This can be accomplished by any known smoothing, rounding, or polishing methods, including without limitation mechanical, chemical, electrical, thermal, and/or plasma methods.

The membrane of the present invention can comprise a single layer or a plurality of layers, each of which can comprise one or more materials, which can be the same or different from the material or materials of the support structure. Without limitation, the membrane can comprise any material or materials known in the art. By way of example and not limitation, a membrane of the present invention for use in a radiation window (or any of many other applications) could advantageously comprise any one or more of the support structure materials listed above and/or any one or more of the following: lanthanum, lanthanum oxide, cesium, cesium iodide, barium, and amino phosphonates.

The membrane need not be completely solid or contiguous, but it can be configured as multiple separate pieces, and/or it can be perforated or woven or otherwise configured so as to have a non-insignificant fractional open area (such as a fabric or mesh or grid). The membrane can also be fabricated using any known fabrication methods. By way of example and not limitation, the layer or layers of a membrane of the present invention for use in a radiation window (or any of many other applications) could be fabricated by means of extrusion, rolling, stretching, weaving, film blowing, floating, spin coating, spraying, immersion, puddling, epitaxy, evaporation, chemical vapor deposition, physical vapor deposition, atomic layer deposition (including plasma enhanced and remote plasma enhanced methods), sputtering, anodizing, thermal layer growth, etc. Further, different areas of the membrane can advantageously comprise different numbers of layers, different thicknesses of layers, and/or different material compositions. Layers that are applied as coatings on the membrane can advantageously be applied either before or after the membrane has been attached to the support structure, and in the latter case part or all of the support structure may advantageously be coated as well. Such coating layers can also advantageously be applied to all or part of an assembly comprising the membrane, the support structure or structures, any housing or other structure to which the flange or flanges are attached or joined, and any joining materials employed therein.

As emphasized above, the present invention is applicable to a variety of different applications, and none of the specific applications, embodiments, or examples identified herein are to be construed as limitations on the intended applicability of the invention. Further, applications identified in any dependent claim appended hereto (for example: radiation windows; filters for liquids, solids, and/or gases; pressure transducers; etc.) are not to be construed as limiting the applicability of any other claim that is not expressly dependent upon said dependent claim. On the contrary, the identification of specific applications in said dependent claims is to be construed as an express indication that the other claims that do not expressly depend upon said dependent claims are intended to have broader applicability.

The present invention also expressly covers radiation detectors and radiation sources that employ one or more radiation windows as disclosed herein, including without limitation X-ray detectors and X-ray sources employing such windows. Such a radiation detector comprises a sensor configured to detect radiation, disposed behind such a radiation window. Such a radiation source comprises a means for producing radiation, disposed behind such a radiation window. In this context, "disposed behind" the radiation window simply means that the radiation window is in the path of the radiation and comprises some sort of barrier that separates the radiation detector or the means for producing radiation, as the case may be, from the environment beyond it. Radiation sensors and means for producing radiation are well-known in the art, so they require no further discussion herein.

In the embodiments of the present invention illustrated and described above, it will be recognized that individual elements and/or features thereof are not necessarily limited to a particular embodiment but, where applicable, are interchangeable and can be used in any selected embodiment even though such may not have been specifically shown. It is also to be understood that the above-referenced example embodiments are not intended to be an exclusive or exhaustive list of the embodiments covered by this invention, but are only illustrative of the application of the principles and concepts of the present invention. The inventive concepts and features disclosed herein may be implemented in a wide variety of useful combinations and arrangements, or they may be implemented separately. While the invention has been shown in the drawings and fully described above with particularity and detail in connection with what are presently deemed to be the most practical and preferred embodiments of the invention, it will be apparent to those of ordinary skill in the art that numerous variations, combinations, and equivalents can be devised without departing from the principles and concepts of the invention as set forth herein. The invention should therefore not be limited by the above-described embodiments, methods, and examples, but by all embodiments and methods that are within the scope and spirit of the invention.

We claim:

1. A support structure for a membrane, said support structure comprising a plurality of support members and at least one flange, said plurality of support members comprising a plurality of sets of spoke-like support members including:
   (a) a first set comprising a plurality of spoke-like support members that extend generally from at least one flange toward a common hub, each spoke-like support member of this first set comprising:
      (i) a distal end located farther from the hub and joined directly or indirectly to at least one flange; and
      (ii) a proximal end located nearer the hub and joined directly or indirectly to the proximal end of each other spoke-like support member of this first set;
   (b) at least one subsequent set, each comprising a plurality of spoke-like support members that are distributed between circumferentially adjacent pairs of spoke-like support members from the prior sets and that extend generally from at least one flange toward the hub, each spoke-like support member of each such subsequent set comprising:
      (i) a distal end located farther from the hub and joined directly or indirectly to at least one flange; and
      (ii) a proximal end located nearer the hub and connected to the nearest circumferentially adjacent pair of spoke-like support members from the prior sets via a pair of substantially straight anchoring support members, said anchoring support members joining together and forming an angular joint at or near said proximal end, said angular joint defining an angle smaller than 180 degrees with the vertex thereof pointing generally away from the hub.

2. A support structure as defined in claim 1, wherein at least a subset of the angular joints formed by the pairs of anchoring support members define angles greater than 7 degrees but smaller than 173 degrees.

3. A support structure as defined in claim 2, coupled with at least one membrane supported by said support structure.

4. A support structure coupled with at least one membrane as defined in claim 3, configured to pass radiation therethrough so as to function as a radiation window.

5. A support structure coupled with at least one membrane as defined in claim 3, configured to function as a filter for at least one type of matter selected from the group consisting of liquid matter, solid matter, and gaseous matter.

6. A support structure coupled with at least one membrane as defined in claim 3, configured as a pressure-detecting element for a pressure transducer.

7. A support structure coupled with at least one membrane as defined in claim 3, wherein said plurality of sets of spoke-like support members includes a first set and at least two subsequent sets.

8. A support structure coupled with at least one membrane as defined in claim 7, configured to pass radiation therethrough so as to function as a radiation window.

9. A plurality of support structures as defined in claim 2, grouped laterally and joined together directly or indirectly to form a unit.

10. A unit as defined in claim 9, further supported by at least one secondary support structure.

11. A support structure as defined in Claim 2, wherein the distal ends of at least a subset of the spoke-like support members are joined directly to said at least one flange.

12. A support structure as defined in Claim 2, wherein the proximal ends of at least a subset of the spoke-like support members of the first set are joined directly to one another.

13. A support structure as defined in claim 2, wherein the proximal ends of at least a subset of the spoke-like support members of the first set are joined indirectly to one another via a plurality of support members that are joined together in the shape of a polygon.

14. A support structure as defined in claim 1, wherein:
(a) said plurality of support members define a primary supporting area;
(b) the primary supporting area has generally lesser mechanical rigidity than at least one flange;
(c) the distal ends of at least a subset of the spoke-like support members are joined indirectly to said at least one flange via a transition region; and
(d) the transition region has generally greater mechanical rigidity than the primary supporting area and generally lesser mechanical rigidity than said at least one flange, thereby providing an intermediate rigidity transition between the dissimilar rigidities of the primary supporting area and said at least one flange.

15. A support structure as defined in claim 14, wherein at least a subset of the angular joints formed by the pairs of anchoring support members define angles greater than 7 degrees but smaller than 173 degrees.

16. A support structure as defined in claim 15, coupled with at least one membrane supported by said support structure.

17. A support structure coupled with at least one membrane as defined in claim 16, configured to pass radiation therethrough so as to function as a radiation window.

18. A support structure coupled with at least one membrane as defined in claim 16, configured to function as a filter for at least one type of matter selected from the group consisting of liquid matter, solid matter, and gaseous matter.

19. A support structure coupled with at least one membrane as defined in claim 16, configured as a pressure-detecting element for a pressure transducer.

20. A support structure coupled with at least one membrane as defined in claim 16, wherein said plurality of sets of spoke-like support members includes a first set and at least two subsequent sets.

21. A support structure coupled with at least one membrane as defined in claim 20, configured to pass radiation therethrough so as to function as a radiation window.

22. A plurality of support structures as defined in claim 15, grouped laterally and joined together directly or indirectly to form a unit.

23. A unit as defined in claim 22, further supported by at least one secondary support structure.

24. A support structure as defined in claim 1, wherein said support structure is fabricated as a single, integral unit.

25. A support structure as defined in claim 1, wherein the proximal ends of at least a subset of the spoke-like support members of the first set are joined indirectly to one another via a plurality of support members that are joined together in the shape of a polygon.

26. A support structure as defined in claim 1, coupled with at least one membrane supported by said support structure.

27. A support structure coupled with at least one membrane as defined in claim 26, configured to pass radiation therethrough so as to function as a radiation window.

28. A radiation window as defined in claim 27, wherein the support structure comprises a material selected from the group consisting of carbon, diamond, graphene, graphite, graphitic carbon, carbon composite, carbon nanotubes, boron, boron carbide, boron hydride composition, boron nitride, silicon, silicon carbide, silicon nitride, quartz, glass, ceramic, aluminum oxide, aluminum nitride, beryllium, beryllium-copper, copper, lithium, aluminum, magnesium, nickel, tungsten, molybdenum, stainless steel, chromium, titanium, photodefinable material, and polymer.

29. A radiation window as defined in claim 27, wherein the support structure is fabricated by at least one process selected from the group consisting of machining, chemical etching, electroforming, reactive ion etching, plasma etching, laser cutting, laser ablation, water jet cutting, laser microjet cutting, ion milling, electrical discharge machining, photolithography, molding, and additive manufacturing.

30. A radiation window as defined in claim 27, wherein said at least one membrane comprises a material selected from the group consisting of carbon, diamond, graphene, graphite, graphitic carbon, carbon composite, carbon nanotubes, boron, boron carbide, boron hydride composition, boron nitride, silicon, silicon carbide, silicon nitride, quartz, mica, glass, aluminum oxide, aluminum nitride, beryllium, lithium, aluminum, magnesium, and polymer.

31. A support structure coupled with at least one membrane as defined in claim 26, configured to function as a filter for at least one type of matter selected from the group consisting of liquid matter, solid matter, and gaseous matter.

32. A support structure coupled with at least one membrane as defined in claim 26, configured as a pressure-detecting element for a pressure transducer.

33. A support structure coupled with at least one membrane as defined in claim 26, wherein said plurality of sets of spoke-like support members includes a first set and at least two subsequent sets.

34. A support structure coupled with at least one membrane as defined in claim 33, configured to pass radiation therethrough so as to function as a radiation window.

35. A plurality of support structures as defined in claim 1, grouped laterally and joined together directly or indirectly to form a unit.

36. A unit as defined in claim 35, further supported by at least one secondary support structure.

* * * * *